(12) United States Patent  
Yamamura et al.

(10) Patent No.: US 11,749,033 B2  
(45) Date of Patent: Sep. 5, 2023

(54) ABNORMAL NOISE EVALUATION SYSTEM AND ABNORMAL NOISE EVALUATION METHOD

(71) Applicant: TOYOTA JIDOSHA KABUSHIKI KAISHA, Toyota (JP)

(72) Inventors: Shugen Yamamura, Nagoya (JP); Satoshi Miyake, Toyota (JP); Masayuki Okamoto, Nagoya (JP); Ryo Matsumoto, Toyota (JP); Naritomo Miura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 103 days.

(21) Appl. No.: 17/172,184

(22) Filed: Feb. 10, 2021

(65) Prior Publication Data

US 2021/0327175 A1 Oct. 21, 2021

(30) Foreign Application Priority Data

Apr. 16, 2020 (JP) .............................. JP2020-073482

(51) Int. Cl.
*G07C 5/08* (2006.01)
*G07C 5/00* (2006.01)

(52) U.S. Cl.
CPC ........... *G07C 5/0833* (2013.01); *G07C 5/008* (2013.01); *G07C 5/0808* (2013.01)

(58) Field of Classification Search
CPC .... G07C 5/0833; G07C 5/008; G07C 5/0808; G01H 3/10; G01H 3/04; G01H 17/00; G01M 15/12; G01M 17/007
See application file for complete search history.

(56) References Cited

U.S. PATENT DOCUMENTS

| 7,751,955 | B2 * | 7/2010 | Chinnadurai | ...... G05B 23/0235 |
| | | | | 701/29.3 |
| 8,239,094 | B2 * | 8/2012 | Underdal | ............ G01M 17/007 |
| | | | | 701/31.4 |
| 8,412,402 | B2 * | 4/2013 | Underdal | ............... G06N 5/022 |
| | | | | 701/29.1 |

(Continued)

FOREIGN PATENT DOCUMENTS

DE 102016206809 A1 10/2017
JP H11-153476 A 6/1999

(Continued)

*Primary Examiner* — Joseph J Dallo
(74) *Attorney, Agent, or Firm* — Oliff PLC

(57) ABSTRACT

In an abnormal noise evaluation system, running noise of a vehicle is acquired, and the running noise is analyzed to generate analysis data. A rotational order component of the running noise of the vehicle is then extracted from the analysis data, and features for each rotational order of the running noise of the vehicle is generated based on the extracted rotational order component. Subsequently, a learning model is generated using as training data a combination of the features for each rotational order generated for a learning object that is of the same type as an object to be evaluated and an evaluation result given in advance to the learning object. Whether there is abnormal noise from the object to be evaluated is evaluated by applying the features for each rotational order generated for the object to be evaluated to the learning model, and an evaluation result is output.

8 Claims, 12 Drawing Sheets

(56) References Cited

U.S. PATENT DOCUMENTS

| | | | |
|---|---|---|---|
| 8,423,226 B2* | 4/2013 | Underdal | G06N 7/005 |
| | | | 701/31.4 |
| 8,428,813 B2* | 4/2013 | Gilbert | G06N 5/04 |
| | | | 701/31.4 |
| 8,648,700 B2* | 2/2014 | Gilbert | B60R 16/0234 |
| | | | 340/439 |
| 8,762,165 B2* | 6/2014 | Gilbert | G06N 7/00 |
| | | | 705/2 |
| 8,843,348 B2* | 9/2014 | Pascu | G01M 15/00 |
| | | | 702/183 |
| 9,081,883 B2* | 7/2015 | Wittliff, III | G16H 50/20 |
| 9,761,027 B2* | 9/2017 | Williams | G05B 23/0205 |
| 10,607,626 B1* | 3/2020 | Lung | G01M 7/00 |
| 10,943,486 B2* | 3/2021 | Lee | G06N 3/0445 |
| 10,998,872 B2* | 5/2021 | Renner | H04N 21/462 |
| 11,361,782 B2* | 6/2022 | Ninomiya | H04R 1/406 |
| 2005/0177352 A1 | 8/2005 | Gravel | |
| 2019/0114849 A1 | 4/2019 | Lee et al. | |
| 2019/0295567 A1 | 9/2019 | Sudo | |

FOREIGN PATENT DOCUMENTS

| | | |
|---|---|---|
| JP | 2008-298474 A | 12/2008 |
| JP | 2014-222189 A | 11/2014 |
| JP | 2019-027814 A | 2/2019 |
| JP | 2019-164106 A | 9/2019 |

\* cited by examiner

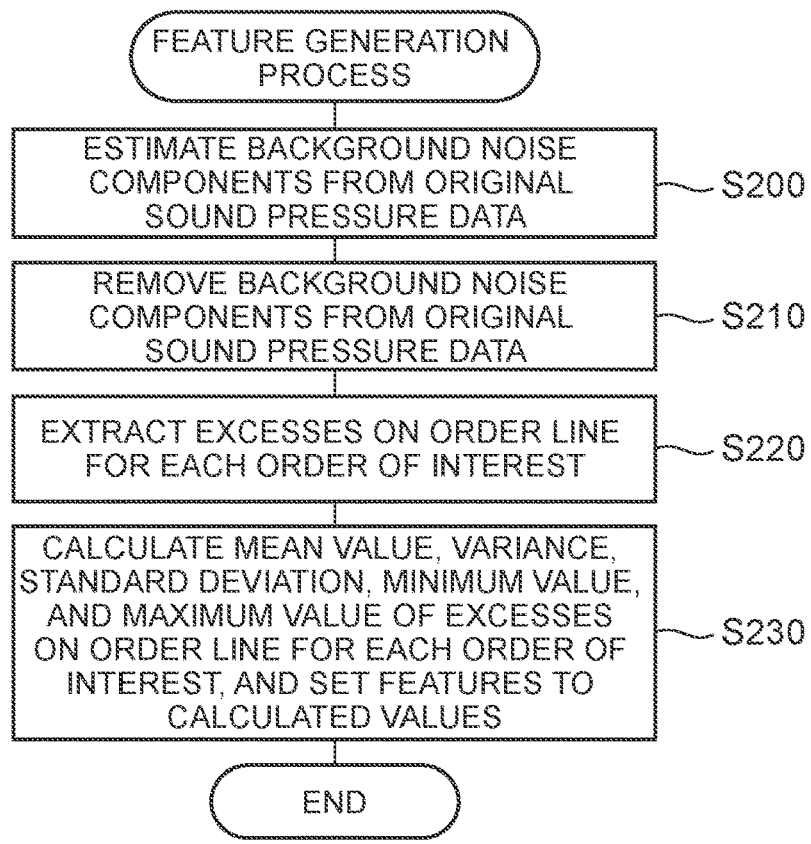
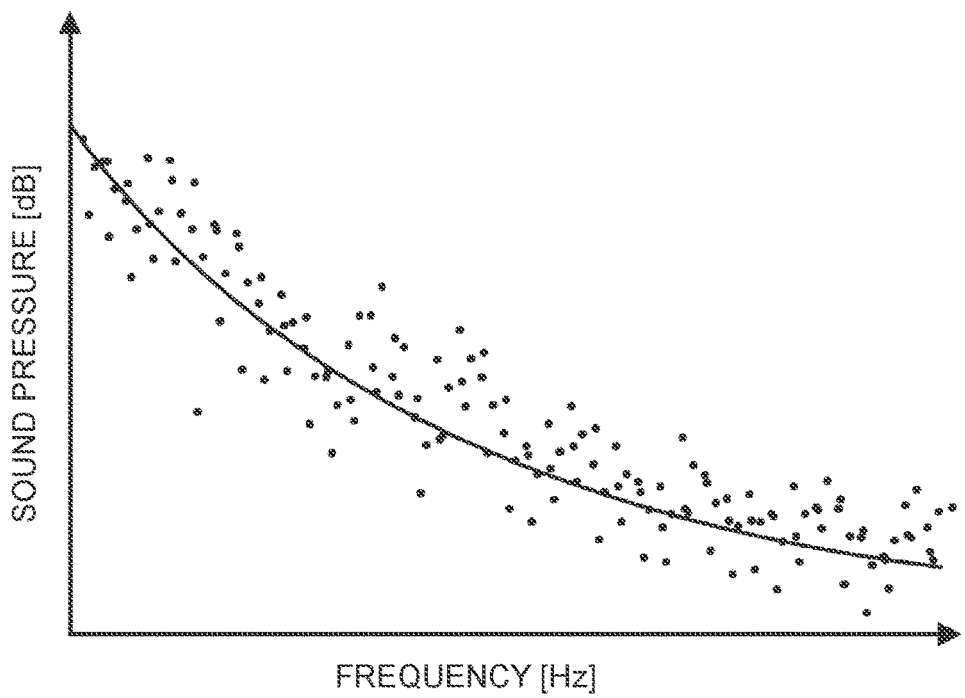

ORDER OF INTEREST α    ORDER OF INTEREST β

|  | STATISTICAL VALUES | | | |
|---|---|---|---|---|
|  | VARIANCE | MEAN VALUE | MAXIMUM VALUE | ... |
| ORDER OF INTEREST α | 5.2 | 11.2 | 24.2 | ... |
| ORDER OF INTEREST β | ... | ... | ... | ... |
| ⋮ | ⋮ | ⋮ | ⋮ | ⋮ |

| | DATA | VARIANCE | MEAN VALUE | MAXIMUM VALUE | ... | SCORE |
|---|---|---|---|---|---|---|
| No.1 | ORDER OF INTEREST α | 5.2 | 11.2 | 24.2 | ... | 3.0 |
| | ORDER OF INTEREST β | ... | ... | ... | ... | |
| | ⋮ | ⋮ | ⋮ | ⋮ | ⋮ | |
| No.2 | ORDER OF INTEREST α | ... | ... | ... | ... | ... |
| | ORDER OF INTEREST β | ... | ... | ... | ... | |
| | ⋮ | ⋮ | ⋮ | ⋮ | ⋮ | |
| ⋮ | ⋮ | ⋮ | ⋮ | ⋮ | ⋮ | ⋮ |

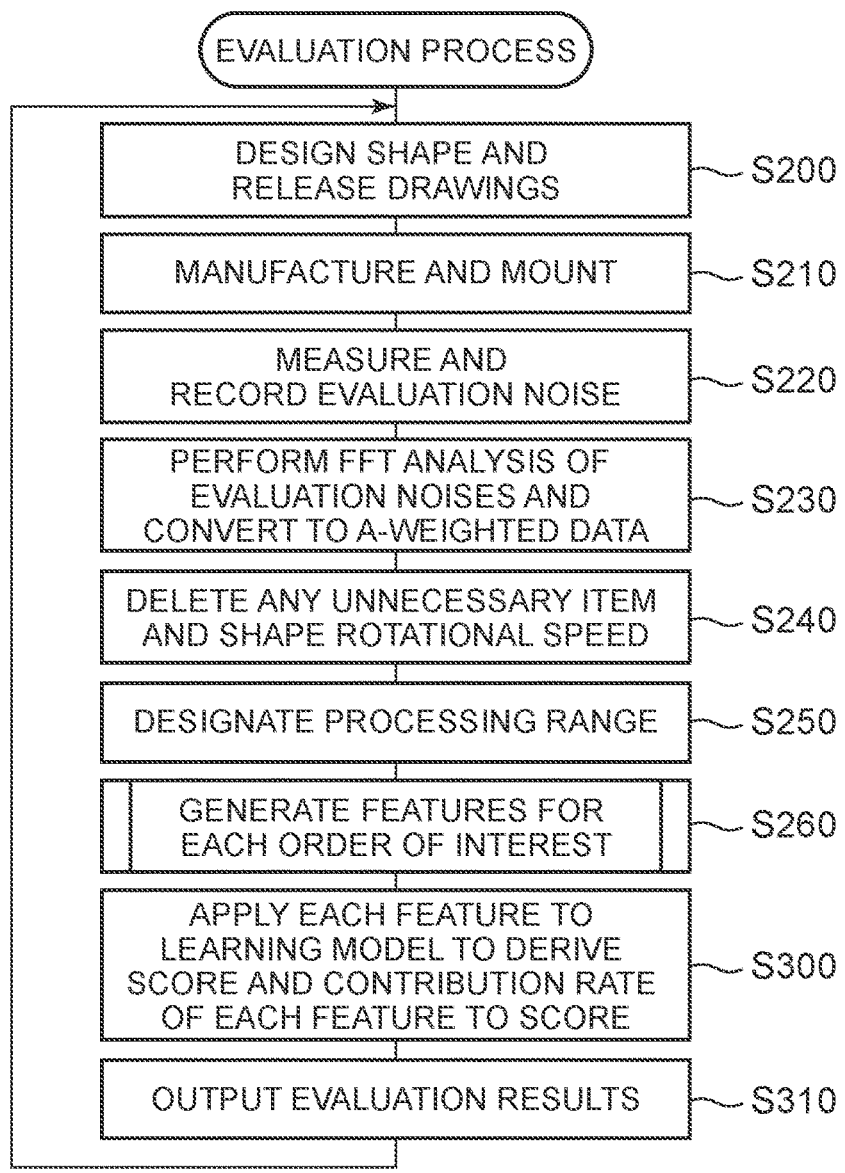

| | OCTAVE CENTER FREQUENCY [Hz] | | |
|---|---|---|---|
| | 2000 | 4000 | 8000 |
| ORDER OF INTEREST $\alpha$ | $a_\alpha \times a_{2000}$ | $a_\alpha \times a_{4000}$ | $a_\alpha \times a_{8000}$ |
| ORDER OF INTEREST $\beta$ | $a_\beta \times a_{2000}$ | $a_\beta \times a_{2000}$ | $a_\beta \times a_{8000}$ |
| ⋮ | ⋮ | ⋮ | ⋮ |

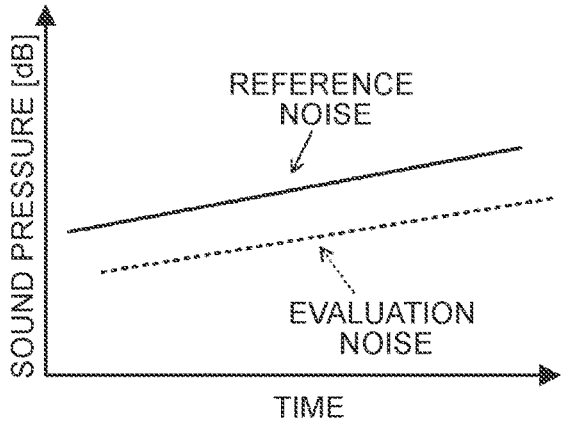
FIG. 17A
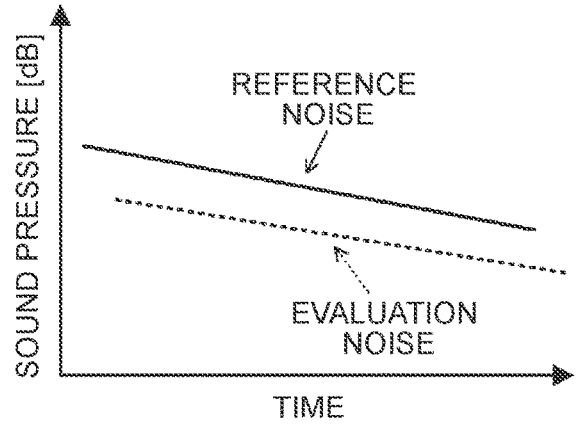
FIG. 17B
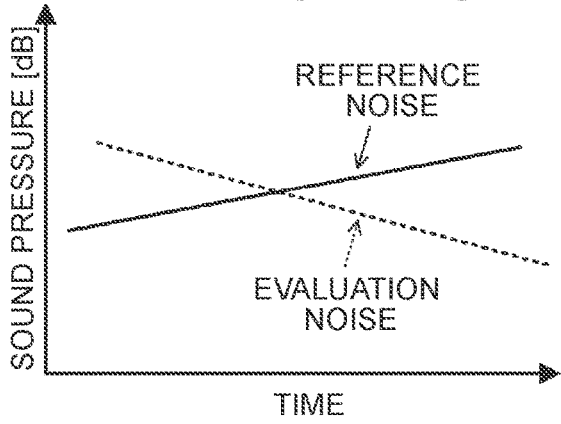
FIG. 17C
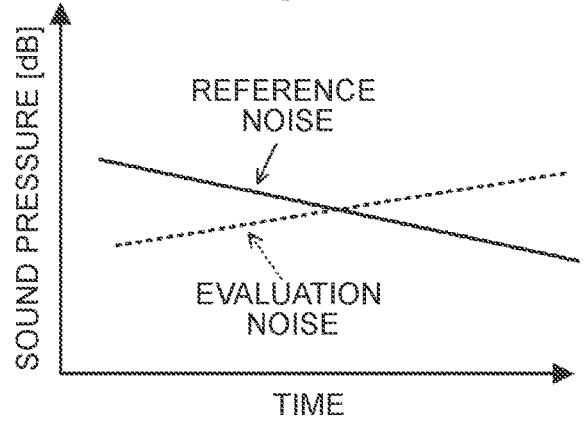
FIG. 17D
FIG. 18
| DATA | | OCTAVE CENTER FREQUENCY [Hz] | | | SCORE |
|---|---|---|---|---|---|
| | | 2000 | 4000 | 8000 | |
| No.1 | ORDER OF INTEREST α | 0 | 3 | -4 | 3.0 |
| | ORDER OF INTEREST β | 4 | 5 | 1 | |
| | ⋮ | ⋮ | ⋮ | ⋮ | |
| No.2 | ORDER OF INTEREST α | ... | ... | ... | ... |
| | ORDER OF INTEREST β | ... | ... | ... | |
| | ⋮ | ⋮ | ⋮ | ⋮ | |
| ⋮ | ⋮ | ⋮ | ⋮ | ⋮ | ⋮ |

FIG. 19

| | OCTAVE CENTER FREQUENCY [Hz] | | | SCORE |
|---|---|---|---|---|
| | 2000 | 4000 | 8000 | |
| ORDER OF INTEREST $\alpha$ | 0.1 | 0.05 | 0.05 | 3.5 |
| ORDER OF INTEREST $\beta$ | 0.01 | 0.4 | 0.08 | |
| ⋮ | ⋮ | ⋮ | ⋮ | |

ABNORMAL NOISE EVALUATION SYSTEM AND ABNORMAL NOISE EVALUATION METHOD

CROSS-REFERENCE TO RELATED APPLICATION

This application claims priority to Japanese Patent Application No. 2020-073482 filed on Apr. 16, 2020, incorporated herein by reference in its entirety.

BACKGROUND

1. Technical Field

The disclosure relates to abnormal noise evaluation systems and abnormal noise evaluation methods.

2. Description of Related Art

A system that determines whether there is abnormal noise while a vehicle is traveling is conventionally proposed as an abnormal noise evaluation system (see, e.g., Japanese Unexamined Patent Application Publication No. 2014-222189 (JP 2014-222189 A)). In this system, running noise of a vehicle is first recorded, and a frequency analysis (short-time fast Fourier transform (FFT)) of the recorded noise data is performed to calculate frequency-sound pressure level waveforms in a predetermined frequency range. Next, a line connecting the representative values (modes) for each frequency in the frequency-sound pressure level waveforms is calculated as estimated background noise values. The estimated background noise values are offset by a predetermined offset amount to a higher sound pressure level in the frequency-sound pressure level waveforms, and a threshold level is set to the offset estimated background noise values. The area of a part in the frequency-sound pressure level waveforms that is higher than the threshold level is calculated as an excess area, and whether there is abnormal noise is determined by comparing the excess area with a preset determination value.

SUMMARY

In the above system, however, the evaluation results may not be proper results as abnormal noise evaluation does not necessarily correlate with human sensory evaluation. It is therefore desired to develop an accurate evaluation method that correlates with human sensory evaluation.

The disclosure provides an accurate abnormal noise evaluation system and an accurate abnormal noise evaluation method that correlate with human sensory evaluation when evaluating whether there is abnormal noise from an object to be evaluated including a rotating body mounted on a vehicle.

A first aspect of the disclosure relates to an abnormal noise evaluation system that evaluates whether there is abnormal noise from an object to be evaluated including a rotating body mounted on a vehicle. The abnormal noise evaluation system of the first aspect includes an analysis device, a feature generation unit, a learning unit, an evaluation unit, and an output unit. The analysis device is configured to acquire running noise of the vehicle and analyze the running noise of the vehicle to generate analysis data. The feature generation unit is configured to extract a rotational order component of the running noise of the vehicle from the analysis data and generate features for each rotational order of the running noise of the vehicle based on the extracted rotational order component. The learning unit is configured to generate a learning model as training data, using a combination of the features for each rotational order and an evaluation result, the features for each rotational order being generated by the analysis device and the feature generation unit for a learning object that is of the same type as the object to be evaluated, the evaluation result being given in advance to the learning object. The evaluation unit is configured to evaluate whether there is abnormal noise from the object to be evaluated by applying the features for each rotational order generated by the analysis device and the feature generation unit for the object to be evaluated to the learning model. The output unit is configured to output an evaluation result obtained by the evaluation unit.

According to the abnormal noise evaluation system of the first aspect, the running noise of the vehicle is acquired, and the running noise of the vehicle is analyzed to generate the analysis data. The rotational order component of the running noise of the vehicle is then extracted from the analysis data, and the features for each rotational order of the running noise of the vehicle are generated based on the extracted rotational order component. Thereafter, the learning model is generated using as the training data the combination of the features for each rotational order generated for the learning object that is of the same type as the object to be evaluated and the evaluation result given in advance to the learning object. Whether there is abnormal noise from the object to be evaluated is evaluated by applying the features for each rotational order generated for the object to be evaluated to the learning model, and the evaluation result is output. As the evaluation result that is given to the learning object is determined based on human sensory evaluation, the abnormal noise evaluation system of the disclosure is a more accurate evaluation system that correlates with human sensory evaluation when evaluating whether there is abnormal noise from the object to be evaluated including the rotating body mounted on the vehicle.

In the abnormal noise evaluation system of the first aspect, the analysis device may be configured to acquire the running noise of the vehicle at a plurality of rotational speeds of the rotating body and perform a frequency analysis of the running noise of the vehicle for each rotational speed to generate, as the analysis data, sound pressure data representing a sound pressure at each rotational speed and each frequency. The feature generation unit may be configured to extract the rotational order component from the sound pressure data. The rotational order component of the running noise of the vehicle can thus be extracted by a simple process.

In the abnormal noise evaluation system with the above configuration, the feature generation unit may be configured to estimate a background noise component based on the sound pressure data and extract the rotational order component from data resulting from removing the background noise component from the sound pressure data. It is considered that humans are more likely to perceive sound that is more conspicuous than the background noise. According to the abnormal noise evaluation system with the above configuration, the rotational order component is extracted from the data resulting from removing the background noise component from the sound pressure data, and learning and evaluation are performed using the features for each rotational order generated based on the rotational order component. Accordingly, whether there is abnormal noise from the object to be evaluated can be more accurately evaluated.

In the abnormal noise evaluation system with the above configuration, the feature generation unit may be configured to statistically process the rotational order component for each rotational order to generate statistical values for each rotational order as the features for each rotational order. According to the abnormal noise evaluation system with the above configuration, the features that can improve estimation accuracy can be determined by a simple process, and whether there is abnormal noise can be even more accurately evaluated. As used herein, the "statistical values" include a mean value, variance, standard deviation, a minimum value, a maximum value, etc.

In the abnormal noise evaluation system with the above configuration, the feature generation unit may be configured to derive for each rotational order a tendency of a first relationship that is a relationship between the rotational speed and the sound pressure from the sound pressure data, derive a tendency of a second relationship that is a relationship between the rotational speed and the sound pressure at an octave center frequency from the sound pressure data, and compare the tendency of the first relationship and the tendency of the second relationship for each rotational order to produce each comparison result as the features for each rotational order of the running noise of the vehicle. It is considered that humans hear the difference in tendency of noise based on the octave center frequency. According to the abnormal noise evaluation system with the above configuration, the tendency of the relationship between the rotational speed and the sound pressure on the rotational order (first relationship) and the tendency of the relationship between the rotational speed and the sound pressure at the octave center frequency (second relationship) are compared, and learning and evaluation are performed using the comparison results as the features. Accordingly, whether there is abnormal noise from the object to be evaluated can be more accurately evaluated.

In the abnormal noise evaluation system with the above configuration, the feature generation unit may be configured to calculate a slope of a first regression line that is applied to the relationship between the rotational speed and the sound pressure for each rotational order as the tendency of the first relationship and calculate a slope of a second regression line that is applied to the relationship between the rotational speed and the sound pressure at the octave center frequency as the tendency of the second relationship. In the abnormal noise evaluation system with the above configuration, the feature generation unit may be configured to multiply the slope of the first regression line and the slope of the second regression line for each rotational order to generate a multiplied product of the slope of the first regression line and the slope of the second regression line as the features for each rotational order of the running noise of the vehicle. The features that can improve estimation accuracy can thus be determined by a simple process, and whether there is abnormal noise can be even more accurately evaluated.

In the abnormal noise evaluation system of the first aspect, the output unit may be configured to output the evaluation result of the object to be evaluated and a level of contribution of each feature for each rotational order to the evaluation result. According to the abnormal noise evaluation system with the above configuration, a designer can determine which parts of the object to be evaluated need modification by checking which of the rotational orders has a feature with a high level of contribution (importance). Design therefore becomes easy.

An abnormal noise evaluation method of a second aspect of the disclosure is an abnormal noise evaluation method for evaluating whether there is abnormal noise from an object to be evaluated including a rotating body mounted on a vehicle. The abnormal noise evaluation method of the second aspect includes: acquiring running noise of the vehicle and analyzing the running noise of the vehicle to generate analysis data; extracting a rotational order component of the running noise of the vehicle from the analysis data and generating features for each rotational order of the running noise of the vehicle based on the extracted rotational order component; generating a learning model as training data, using a combination of the features for each rotational order and an evaluation result, the features for each rotational order being generated for a learning object that is of the same type as the object to be evaluated, the evaluation result being given in advance to the learning object; and evaluating whether there is abnormal noise from the object to be evaluated by applying the features for each rotational order generated for the object to be evaluated to the learning model.

According to the abnormal noise evaluation method of the second aspect, the running noise of the vehicle is acquired, and the running noise of the vehicle is analyzed to generate the analysis data. The rotational order component of the running noise of the vehicle is then extracted from the analysis data, and the features for each rotational order of the running noise of the vehicle are generated based on the extracted rotational order component. Thereafter, the learning model is generated using as the training data the combination of the features for each rotational order generated for the learning object that is of the same type as the object to be evaluated and the evaluation result given in advance to the learning object. Whether there is abnormal noise from the object to be evaluated is evaluated by applying the features for each rotational order generated for the object to be evaluated to the learning model. As the evaluation result that is given to the learning object is determined based on human sensory evaluation, the abnormal noise evaluation method of the second aspect of the disclosure is a more accurate evaluation method that correlates with human sensory evaluation when evaluating whether there is abnormal noise from the object to be evaluated including the rotating body mounted on the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart illustrating an example of a feature generation process;

FIG. 6 illustrates an example of background noise components;

FIG. 11 illustrates an example of an evaluation process;

FIG. 12 illustrates an example of evaluation results;

FIG. 17A illustrates an example of comparison between reference noise (background noise) and evaluation noise;

FIG. 17B illustrates an example of comparison between reference noise (background noise) and evaluation noise;

FIG. 17C illustrates an example of comparison between reference noise (background noise) and evaluation noise;

FIG. 17D illustrates an example of comparison between reference noise (background noise) and evaluation noise;

FIG. 18 illustrates training data of the second embodiment; and

FIG. 19 illustrates evaluation results of the second embodiment.

DETAILED DESCRIPTION OF EMBODIMENTS

Modes for carrying out the disclosure will be described based on embodiments.

Figure 1:
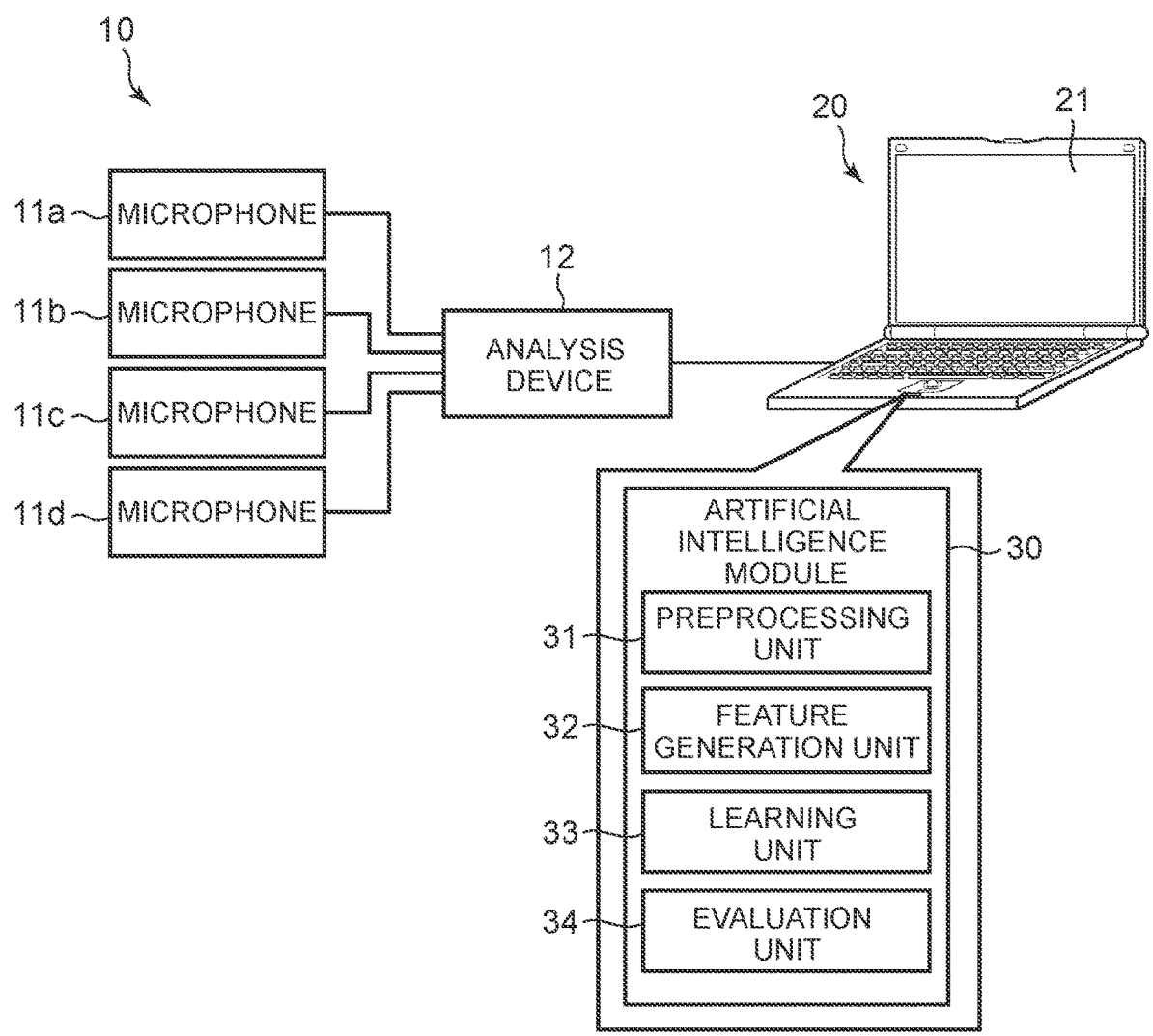
FIG. 1 illustrates a schematic configuration of an abnormal noise evaluation system according to a first embodiment of the disclosure.

FIG. 1 illustrates a schematic configuration of an abnormal noise evaluation system according to a first embodiment of the disclosure. An abnormal noise evaluation system 10 of the first embodiment is configured to evaluate whether there is abnormal noise from an object to be evaluated including a rotating body mounted on a vehicle such as a gear oil pump that is driven by an engine in an automobile equipped with the engine (abnormal noise generated on orders equal to integral multiples of the number of teeth of a gear (hereinafter referred to as the orders of interest). As shown in the figure, the abnormal noise evaluation system 10 includes a plurality of microphones 11a to 11d, an analysis device 12 that analyzes noises collected by the microphones 11a to 11d, and a computer 20 that processes the obtained analysis data. The microphones 11a to 11d are placed near the object to be evaluated (gear oil pump) in the vehicle. Each of the microphones 11a to 11d collects running noise of the vehicle at a plurality of rotational speeds as noise to be evaluated (evaluation noise) of the object to be evaluated. The analysis device 12 performs a fast Fourier transform (FFT) on the evaluation noises collected by the microphones 11a to 11d for each rotational speed.

The computer 20 is a general-purpose personal computer with dedicated application software installed thereon. This general-purpose personal computer includes a keyboard and a mouse as an input device and includes a display 21 as an output device. The computer 20 includes an artificial intelligence module 30. The computer 20 evaluates whether the evaluation noise contains abnormal noise by applying noise data on the evaluation noise received from the analysis device 12 to a trained artificial intelligence (learning model). The artificial intelligence module 30 includes a preprocessing unit 31, a feature generation unit 32, a learning unit 33, and an evaluation unit 34. The preprocessing unit 31 adjusts the noise data on the evaluation noise received from the analysis device 12 to data suitable for the subsequent processing. The feature generation unit 32 generates features of the evaluation noise from the noise data. The learning unit 33 generates a learning model by supervised learning. The evaluation unit 34 evaluates the object to be evaluated by applying the evaluation noise of the object to be evaluated to the learning model.

Next, the operation of the abnormal noise evaluation system 10 configured as described above will be described. Especially, a learning process of generating a learning model for a learning object that is of the same type as the object to be evaluated and an evaluation process of evaluating whether the evaluation noise of the object to be evaluated contains abnormal noise will be described. First, the learning process will be described.

Figure 2:
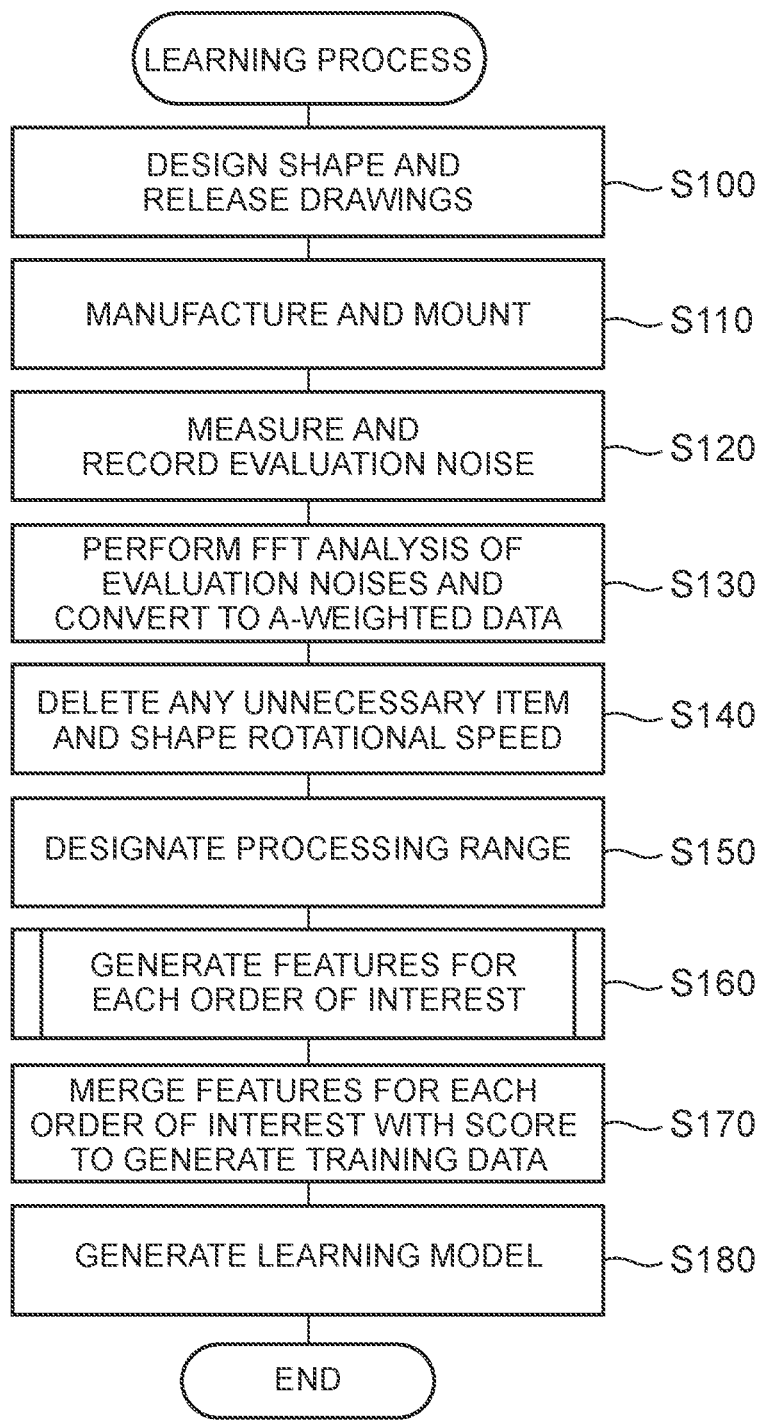
FIG. 2 is a flowchart illustrating an example of a learning process.

FIG. 2 is a flowchart illustrating an example of the learning process. In the learning process, first, the shape of a product of the learning object that is of the same type as the object to be evaluated is designed and drawings of the product are released (step S100). Next, the product is manufactured and mounted on a vehicle based on the design and the drawings (step S110). The microphones 11a to 11d are then placed on the vehicle equipped with the learning object, and running noise of the vehicle at a plurality of rotational speeds in a predetermined rotational speed range (e.g., 1000 to 7000 rpm) of the learning object is collected and recorded by the microphones 11a to 11d (step S120). Specifically, with engine braking being applied by releasing the accelerator, running noise the vehicle makes while the vehicle speed changes from a first vehicle speed to a second vehicle speed lower than the first vehicle speed is collected (recorded) by the plurality of (four) microphones 11a to 11d. In addition, for each of vehicles equipped with different learning objects, running noise the vehicle makes while the vehicle speed changes from the first vehicle speed to the second vehicle speed is similarly collected (recorded) by the microphones 11a to 11d. As a result, n×m pieces of noise data are generated, where n represents the number of learning objects and m represents the number of microphones 11a to 11d used. These pieces of noise data are output to the analysis device 12 as noises to be evaluated (evaluation noises) of the learning objects.

Figure 3:
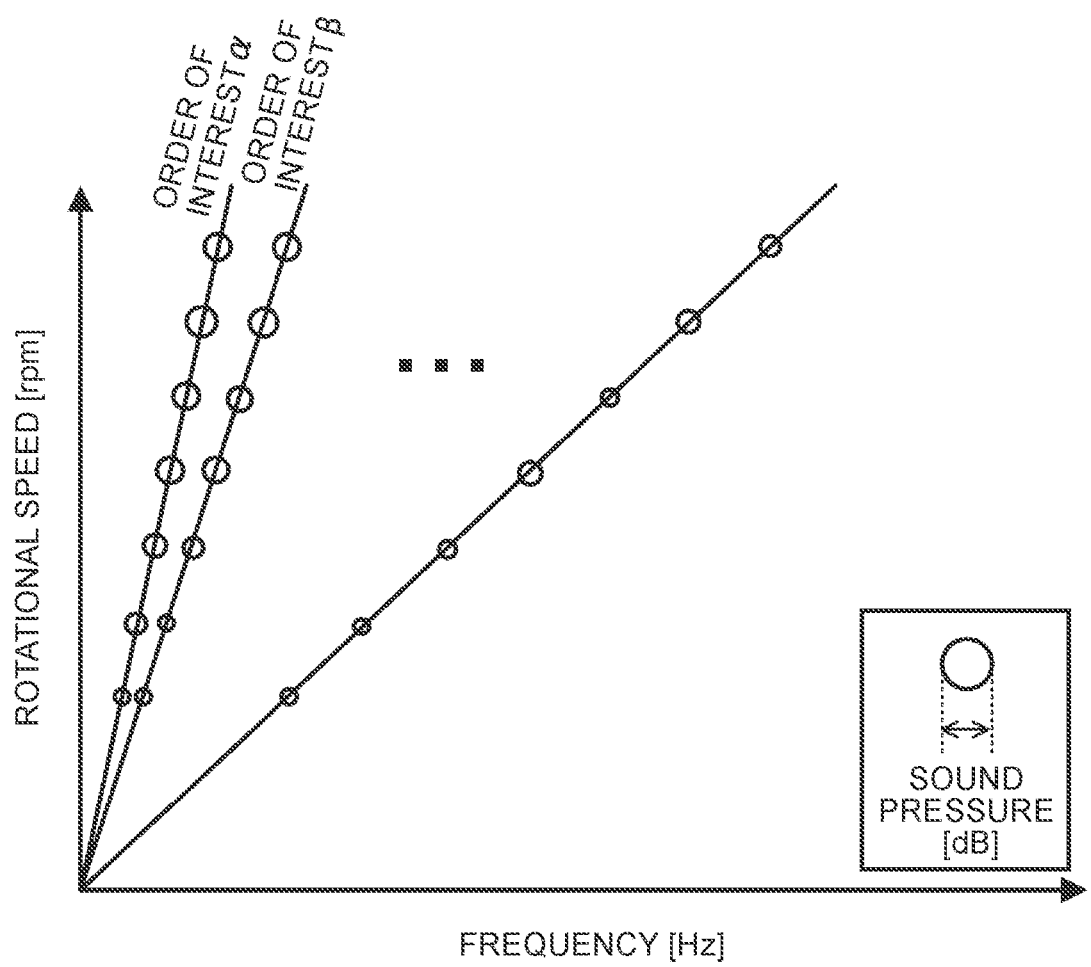
FIG. 3 illustrates an example of a Campbell diagram of noises to be evaluated.

The analysis device 12 performs a fast Fourier transform (FFT) of each received evaluation noise for each rotational speed and converts the resultant data to A-weighted data in view of human hearing characteristics (step S130). Each of the evaluation noises collected by the microphones 11a to 11d is thus converted to sound pressure data corresponding to a Campbell diagram (see FIG. 3) representing the sound pressure level at each rotational speed and each frequency. The plurality of pieces of sound pressure data thus obtained by the analysis device 12 is output to the computer 20 (artificial intelligence module 30) as data files in a predetermined format (CSV files).

Figure 4:
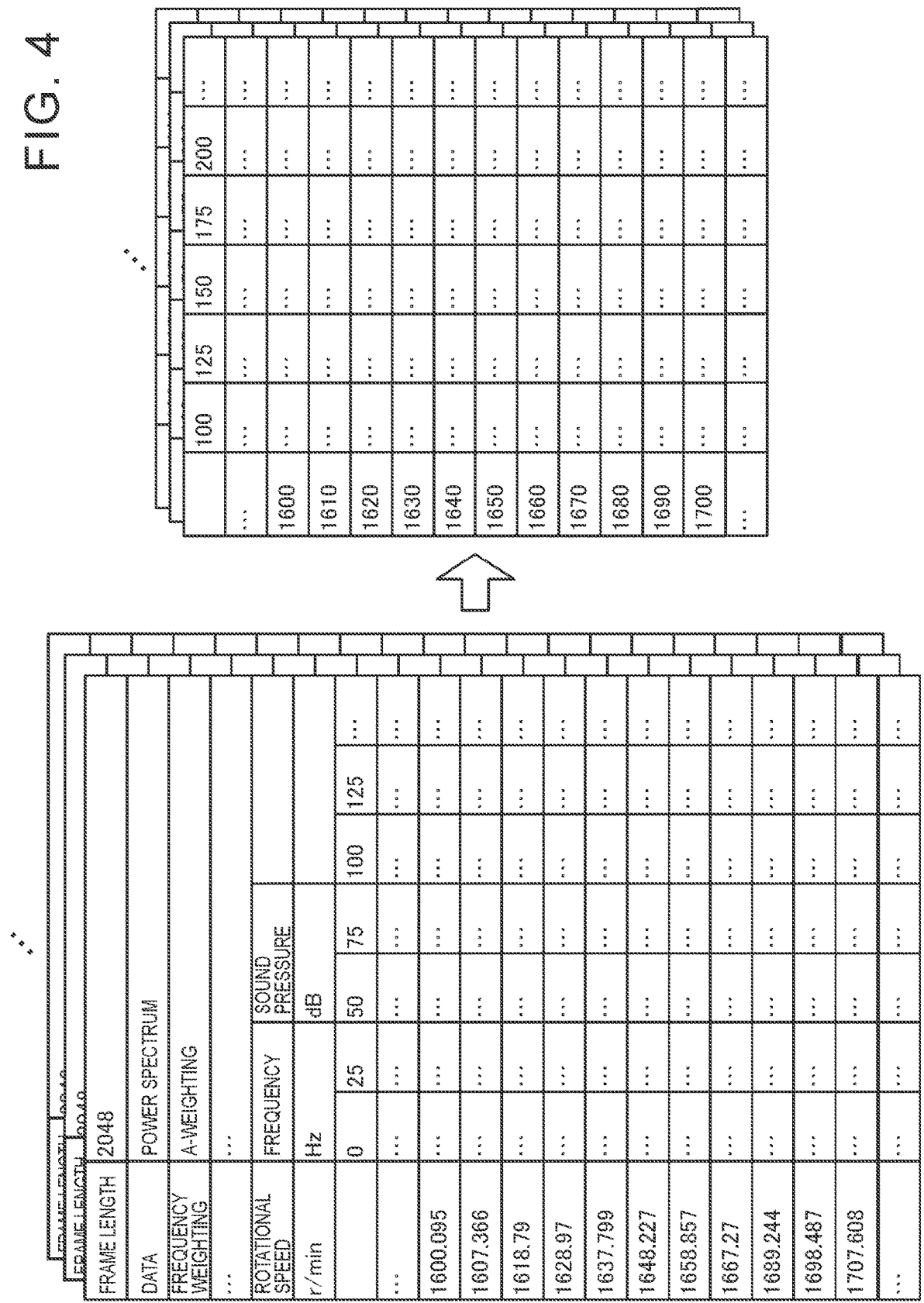
FIG. 4 illustrates data before and after an unnecessary item deletion process and a rotational speed shaping process.

When the pieces of sound pressure data on the evaluation noises are input from the analysis device 12 to the artificial intelligence module 30, the preprocessing unit 31 of the artificial intelligence module 30 performs an unnecessary item deletion process and a rotational speed shaping process (step S140). The unnecessary item deletion process is a process of deleting any unnecessary item from each of the received pieces of sound pressure data on the evaluation noises, and the rotational speed shaping process is a process of shaping the rotational speed. For example, as shown in FIG. 4, the unnecessary item deletion process is a process of deleting header information at the beginning of each data file, and the rotational speed shaping process is a rounding process of rounding the measured values of the rotational speed in each data file so that the measured values of the rotational speed are in increments of a fixed value. Through the rotational speed shaping process, the rotational speed values that vary depending on the sound pressure data on the evaluation noise can be made identical among the pieces of sound pressure data on the evaluation noises, so that the subsequent processing can be properly performed. For example, the rounding process can be performed by taking the difference between every two adjacent ones of the measured values and rounding the measured values to half the maximum difference. Proper rounded values can thus be automatically generated.

Subsequently, the preprocessing unit 31 designates a processing range of the sound pressure data on each evaluation noise (range of data to be used in the subsequent processing) (step S150). This process is a process of designating a rotational speed range and a frequency range to be used for analysis out of the whole rotational speed range and the whole frequency range of the sound pressure data. For example, when the whole rotational speed range of the sound pressure data is 1000 to 7000 rpm, the rotational speed range of about 2000 rpm to about 4500 rpm can be designated as the processing range, and when the whole frequency range of the sound pressure data is 25 Hz to 20 kHz, the frequency range of about 2 kHz to about 10 kHz can be designated as the processing range. As the processing range is thus narrowed, the amount of calculation is reduced, and the time required for analysis is shortened. Moreover, as the ends of the frequency range where FFT errors tend to occur out of the whole frequency range and the low frequency range to which humans are less sensitive out of the human audible range are deleted, the subsequent processing can be properly performed. The sound pressure data on each evaluation noise thus preprocessed by the preprocessing unit 31 is output to the feature generation unit 32.

Figure 7:
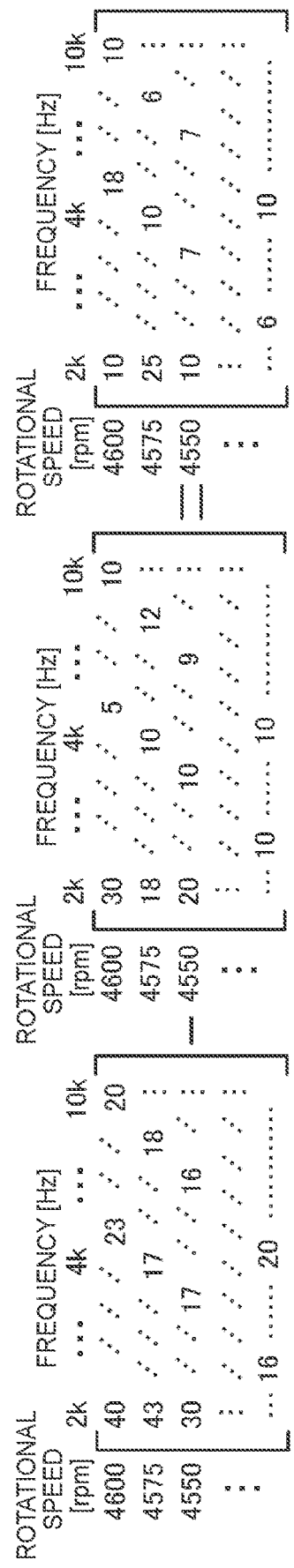
FIG. 7 illustrates how the background noise components are removed from original sound pressure data.
Figures 8, 9, 10:
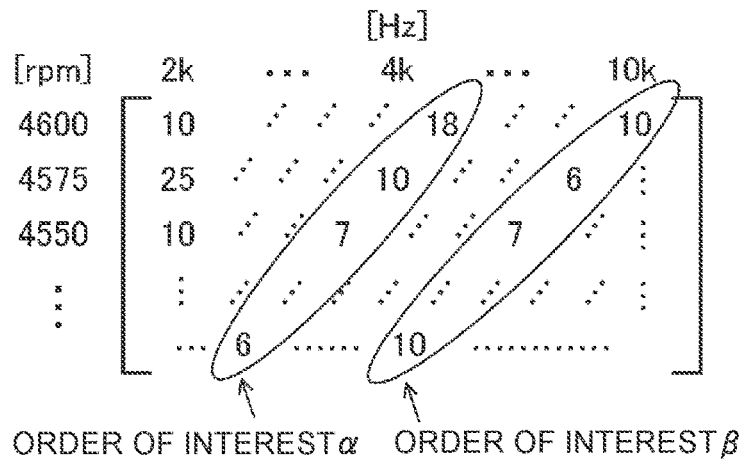
FIG. 8 illustrates excesses on order lines for each order of interest of sound pressure data resulting from removing the background noise components from the original sound pressure data.
FIG. 9 illustrates an example of features for each order of interest and each statistical value.
FIG. 10 illustrates an example of training data.

When the feature generation unit 32 receives the sound pressure data on each evaluation noise, it generates features of each evaluation noise based on the received sound pressure data (step S160). FIG. 5 is a flowchart illustrating an example of a feature generation process. In the feature generation process, the feature generation unit 32 first calculates background noise components in the sound pressure data on each evaluation noise (original sound pressure data) (step S200). As shown in FIG. 6, this process is performed by applying a regression line of a predetermined degree (e.g., a cubic or quartic regression line) to the relationship between the frequency and the sound pressure level for each rotational speed and regarding each value on the applied regression line as a sound pressure level of background noise (ambient noise) at the corresponding rotational speed and the corresponding frequency. Proper background noise can thus be estimated even when it is difficult to directly record the background noise. Subsequently, the background noise components are removed from the original sound pressure data (step S210). As shown in FIG. 7, this process is performed by subtracting the sound pressure level values of the background noise from the sound pressure level values of the original sound pressure data in adjacency matrices of the sound pressure level (corresponding to a Campbell diagram) whose row elements represent one of the rotational speed (rpm) and the frequency (Hz) and whose column elements represent the other. Accordingly, the values of the sound pressure data obtained by subtracting the background noise components from the original sound pressure data represent excess values (excesses) over the sound pressure level of the background noise. Thereafter, the values (excesses) on each order line are extracted from the sound pressure data resulting from subtracting the background noise components from the original sound pressure data (step S220). Regarding the Campbell diagram shown in FIG. 3, the components of the same order appear on a straight line extending obliquely upward to the right. Therefore, as shown in FIG. 8, the excesses on each order line can be extracted by designating, on a straight line extending obliquely upward to the right, the range of the order that matches each order of interest α, β, . . . of the learning object in the adjacency matrix of the sound pressure data corresponding to a Campbell diagram, and then extracting the values in the designated range. Statistical values are calculated for each order of interest α, β, . . . by statistically processing the extracted excesses on the order line, and the features of each order of interest α, β, . . . are set to the corresponding obtained statistical values (step S230). The feature generation process is thus finished. In the first embodiment, the statistical processing is performed by calculating for each order of interest α, β, . . . a part or all of the mean value, variance, standard deviation, minimum value, and maximum value of the excesses on the order line. FIG. 9 illustrates an example of features for each order of interest α, β, . . . and for each statistical value. The features of each evaluation noise are set by repeatedly performing this process for each evaluation noise. The features of each evaluation noise thus generated by the feature generation unit 32 are output to the learning unit 33.

Referring back to the learning process of FIG. 2, the learning unit 33 creates training data for each evaluation noise based on the features of each evaluation noise (step S170). FIG. 10 illustrates an example of the training data. As shown in the figure, the training data is created as sets of input and output for the plurality of (n×m) evaluation noises of the plurality of (n) different learning objects recorded by the plurality of (m) microphones 11a to 11d. The inputs of the training data are the features (statistical values) of each evaluation noise, and the outputs of the training data are scores given in advance for each evaluation noise by human sensory evaluation. A learning model that is the relationship between input and output is generated by machine learning (supervised learning) using the created training data on each evaluation noise (step S180). The learning process is thus completed. Various methods such as decision tree, random forest, k-nearest neighbor algorithm, logistic regression, support vector machine (SVM), neural network (NN), and deep learning can be used as a learning algorithm for the learning unit 33. In the first embodiment, the random forest is used for reasons such as that it is accurate, the model is easy to visualize, and the importance of each feature (contribution rate of each feature to the score) can be calculated when evaluating data containing a plurality of features.

Next, the evaluation process will be described. FIG. 11 is a flowchart illustrating an example of the evaluation process. Since steps S200 to 260 of the evaluation process are similar to steps S100 to S160 of the learning process described above except that the object to be processed is not the evaluation noises of the learning objects but the evaluation noises of the object to be evaluated, description thereof will be omitted.

The evaluation unit 34 derives the scores as outputs by applying the features for each order of interest α, β, . . . and each statistical value (variance, mean value, maximum value, etc.) of the object to be evaluated as inputs to the learning model generated by the learning process (step S300). As described above, since the random forest that is used as the learning algorithm is a combination of a plurality of decision trees, the contribution rate (importance) of each feature to the score can also be derived in addition to the scores of the evaluation noises. The scores and the contribution rates thus derived are output to the display 21 (step S310). The routine then returns to step S200, in which the design is modified etc. based on the evaluation results. FIG. 12 illustrates an example of the evaluation results. As shown in the figure, the score regarding whether there is abnormal noise from the object to be evaluated (e.g., the highest score is 5.0, scoring is done in 0.1 increments, and a passing score is 3.0 or higher) and the contribution rate derived for each order of interest α, β, . . . and each statistical value (variance, mean value, maximum value, etc.) of the object to be evaluated are output as the evaluation results. The designer can thus determine which parts of the object to be evaluated need modification by checking which of the orders of interest α, β, . . . has a high contribution rate and which statistical value of that order has the high contribution rate. Design therefore becomes easy.

As described above, in the first embodiment, a frequency analysis is performed on the running noise (evaluation noise) of the vehicle for each rotational speed to generate original sound pressure data, and the background noise components are removed from the original sound pressure data. Subsequently, the values (excesses over the background noise components) on the order line of each order of interest are extracted from the sound pressure data resulting from removing the background noise components from the original sound pressure data. The features of the evaluation noise for each order of interest are set based on the extracted excesses. This is based on the fact that it is considered that humans are more likely to perceive sound that is more conspicuous than the background noise (reference noise). As learning and evaluation are performed using the features set based on the excesses on the order line that are over the background noise components, whether there is abnormal noise from the object to be evaluated can be accurately evaluated.

The abnormal noise evaluation system 10 of the first embodiment described above generates analysis data by acquiring running noise of the vehicle and analyzing the running noise. The abnormal noise evaluation system 10 then extracts rotational order components of the running noise of the vehicle from the analysis data and generates features for each rotational order of the running noise of the vehicle based on the extracted rotational order components. Subsequently, the abnormal noise evaluation system 10 generates a learning model using, as the training data, combinations of the features for each rotational order generated for the learning objects and the scores given in advance for the learning objects. The abnormal noise evaluation system 10 evaluates whether there is abnormal noise from the object to be evaluated by applying the features for each rotational order generated for the object to be evaluated to the learning model, and outputs the evaluation results. The abnormal noise evaluation system 10 of the present embodiment is therefore a more accurate evaluation system that correlates with human sensory evaluation when evaluating whether there is abnormal noise from an object to be evaluated including a rotating body mounted on a vehicle.

The abnormal noise evaluation system 10 of the first embodiment acquires running noise (evaluation noise) of a vehicle at a plurality of rotational speeds and performs a frequency analysis of the running noise of the vehicle for each rotational speed to generate original sound pressure data that represents the sound pressure level at each rotational speed and each frequency. The abnormal noise evaluation system 10 then extracts values on an order line from the original sound pressure data as rotational order components. The abnormal noise evaluation system 10 can thus extract the rotational order components of the running noise of the vehicle by a simple process.

The abnormal noise evaluation system 10 of the first embodiment estimates background noise components from the original sound pressure data, removes the background noise components from the original sound pressure data, and extracts the rotational order components of the running noise of the vehicle from the remaining sound pressure data. It is considered that humans are more likely to perceive sound that is more conspicuous than the background noise. As the abnormal noise evaluation system 10 extracts the rotational order components from the sound pressure data resulting from removing the background noise components from the original sound pressure data and performing learning and evaluation using the features for each rotational order generated based on the extracted rotational order components, the abnormal noise evaluation system 10 can more accurately evaluate whether there is abnormal noise from the object to be evaluated.

The abnormal noise evaluation system 10 of the first embodiment statistically processes the rotational order components for each rotational order and generates the statistical values obtained for each rotational order as the features for each rotational order. The abnormal noise evaluation system 10 can thus determine the features that can improve estimation accuracy by a simple process and can even more accurately evaluate whether there is abnormal noise.

The abnormal noise evaluation system 10 of the first embodiment outputs the importance of each feature (level of contribution of each feature to the score) as the evaluation results by applying the features to the learning model. The designer can thus determine which parts of the object to be evaluated need modification by checking which of the rotational orders has a feature of high importance. Design therefore becomes easy.

An abnormal noise evaluation system of a second embodiment compares the tendency of the relationship between the rotational speed and the sound pressure level on the order line of each order of interest and the tendency of the relationship between the rotational speed and the sound pressure level at an octave center frequency in original sound pressure data obtained by performing a frequency analysis of evaluation noise for each rotational speed, and sets the features for each order of interest based on the comparison results.

Figure 13:
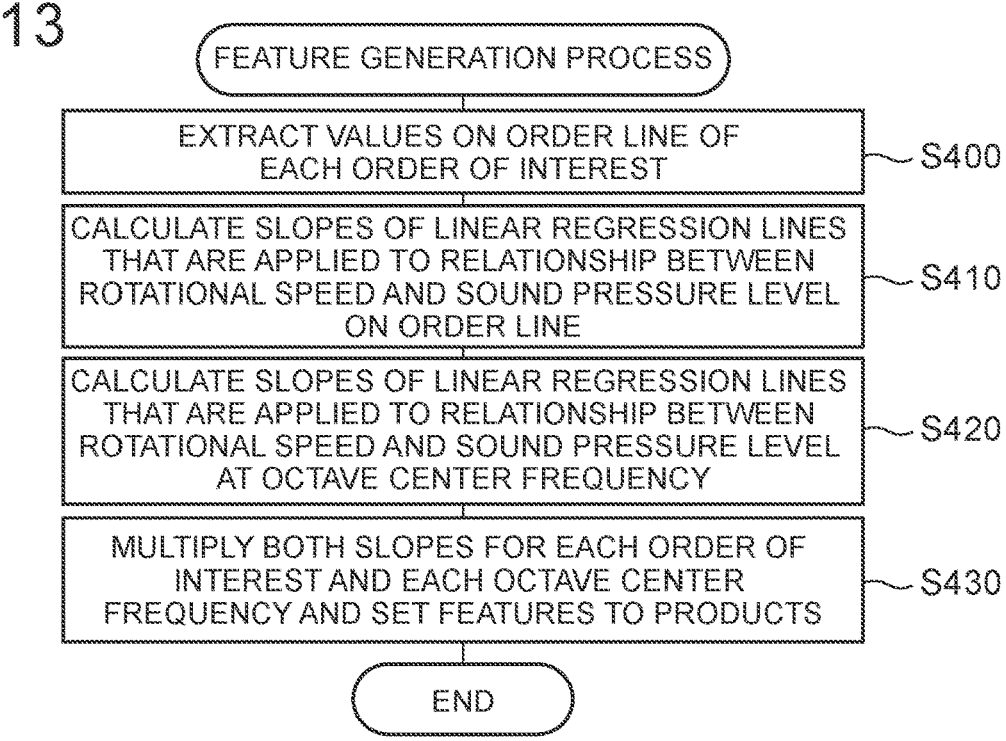
FIG. 13 is a flowchart of a feature generation process of a second embodiment.
Figure 14:
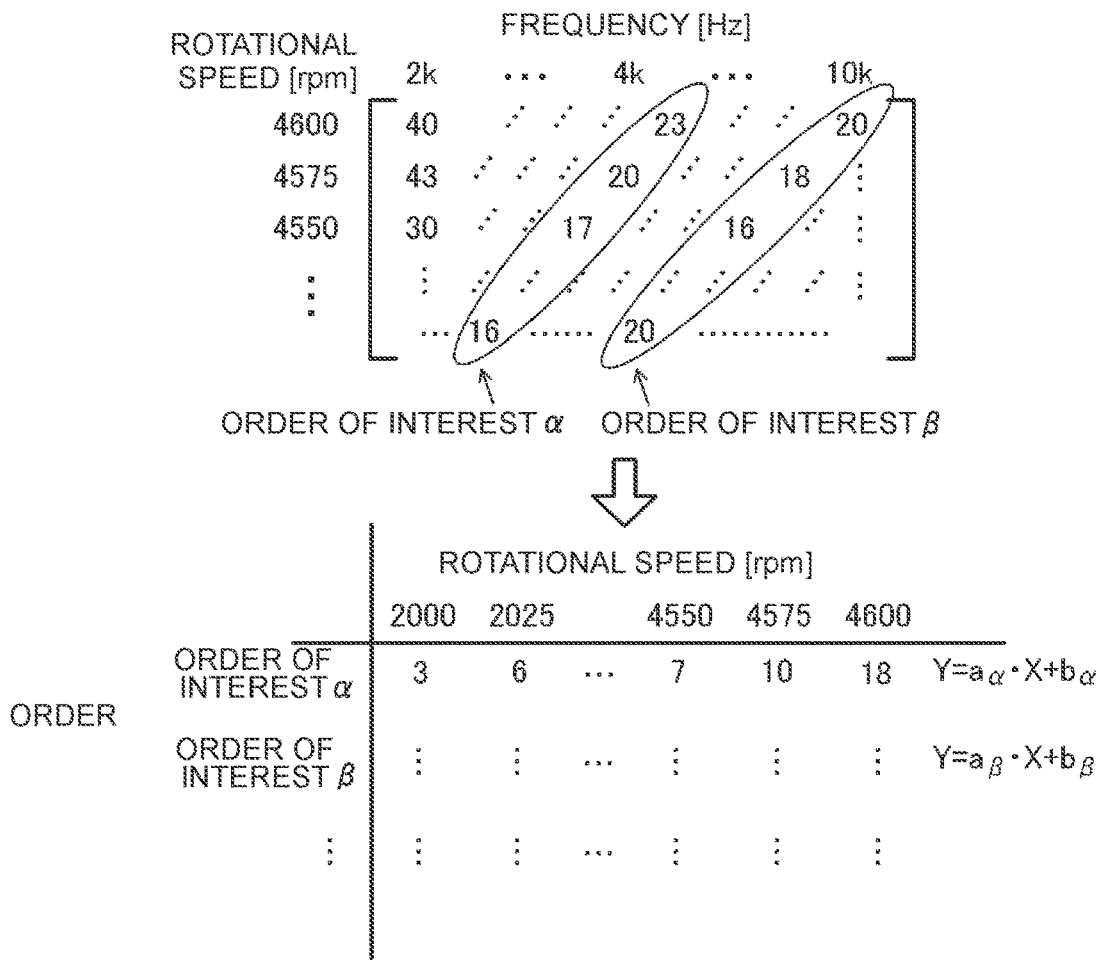
FIG. 14 illustrates linear regression equations that are applied to the relationship between the rotational speed and the sound pressure level for each order of interest of original sound pressure data.
Figures 15, 16:
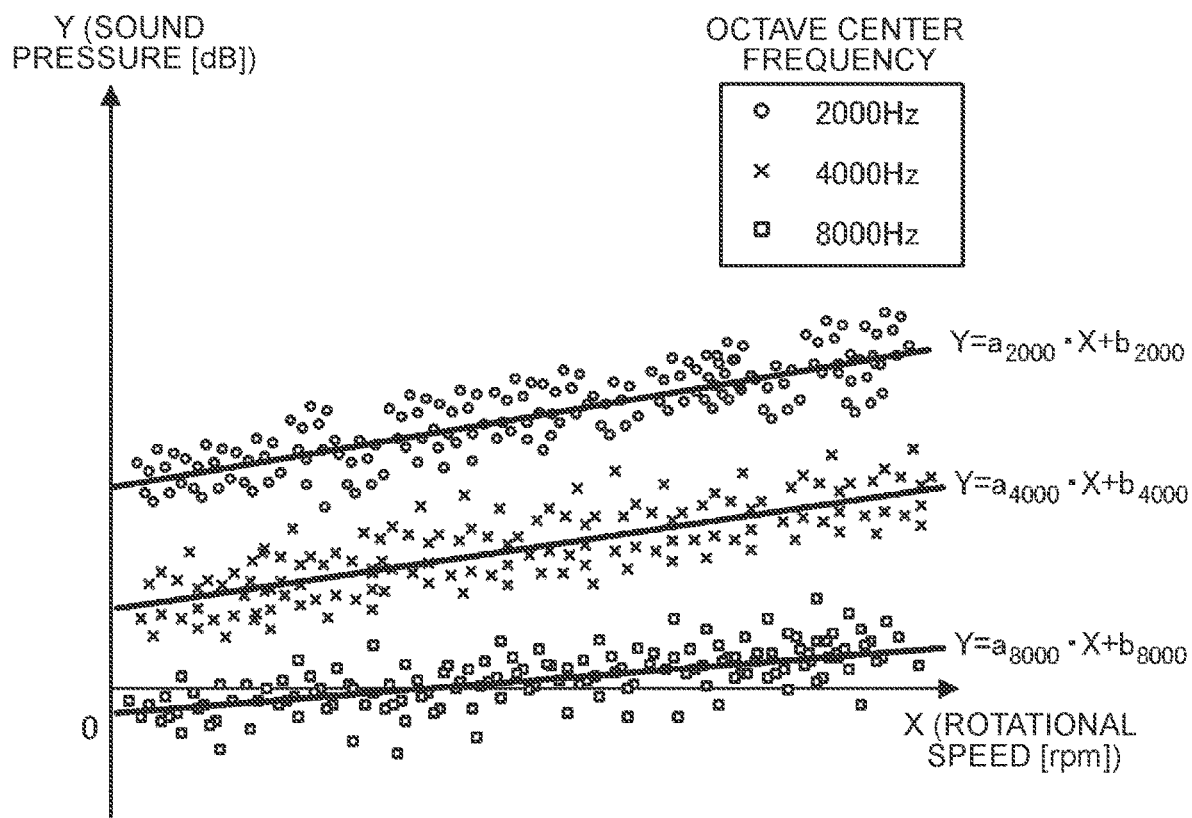
FIG. 15 illustrates linear regression equations that are applied to the relationship between the rotational speed and the sound pressure level for each octave center frequency of the original sound pressure data.
FIG. 16 illustrates features (mathematical expressions) for each order of interest and each octave center frequency.

FIG. 13 is a flowchart of a feature generation process of the second embodiment. Since the learning process and the evaluation process other than the feature generation process are similar to those of the first embodiment, description thereof will be omitted. In the feature generation process of the second embodiment, values (sound pressure levels) on the order line of each order of interest α, β, . . . are first extracted from sound pressure data (original sound pressure data from which background noise components have not been removed) that represents the sound pressure level at each rotational speed and each frequency obtained by performing a frequency analysis for each rotational speed by the analysis device 12 (step S400). Next, slopes aa, αβ, . . . of linear regression lines are calculated by applying the linear regression lines to the relationship between the rotational speed and the sound pressure level of the extracted values on the order line for each order of interest α, β, . . . (step S410). FIG. 14 illustrates the linear regression equations that are applied to the relationship between the rotational speed and the sound pressure level for each order of interest of the original sound pressure data. For each octave center frequency (2 kHz, 4 kHz, and 8 kHz), the sound pressure level at each rotational speed at the octave center frequency is then extracted, and slopes $a_{2000}$, $a_{4000}$, and $a_{8000}$ of linear regression lines are calculated by applying the linear regression lines to the relationship between the rotational speed and the sound pressure level (step S420). FIG. 15 illustrates the linear regression equations (linear regression lines) that are applied to the relationship between the rotational speed and the sound pressure level for each octave center frequency of the original sound pressure data. Both slopes are then multiplied for each order of interest and each octave center frequency, and features for each order of interest and each octave center frequency are set to the resultant products (step S430). The feature generation process is thus finished. FIG. 16 illustrates an example of the features (mathematical expressions) for each order of interest and each octave center frequency.

As described above, in the second embodiment, the slopes of the linear regression lines (evaluation noise) that are applied to the relationship between the rotational speed and the sound pressure level on the order line for each order of interest and the slopes of the linear regression lines (reference noise) that are applied to the relationship between the rotational speed and the sound pressure level for each octave center frequency are calculated for the sound pressure data representing the sound pressure level at each rotational speed and each frequency of the evaluation noise. Both slopes (tendencies) are then multiplied for each order of interest and each octave center frequency, and the features are set to the resultant products for each order of interest and each octave center frequency. This is based on the fact that it is considered that humans are more likely to perceive the difference in change in time from the reference noise (octave center frequency). Accordingly, humans are less likely to perceive the evaluation noise as abnormal noise when the slopes (tendencies) of the reference noise and the evaluation noise are in the same direction as shown in FIGS. 17A and 17B. On the other hand, humans are more likely to perceive the evaluation noise as abnormal noise when the slopes (tendencies) with time of the reference noise and the evaluation noise are in different directions as shown in FIGS. 17C and 17D. In view of this, in the second embodiment, the features are set to the products for each order of interest and each octave center frequency of learning objects, and a learning model is generated by machine learning using sets of the features and the scores given in advance for the learning objects as training data (see FIG. 18). As in the first embodiment, whether there is abnormal noise from the object to be evaluated can be accurately evaluated by applying the products calculated as features for each order of interest and each octave center frequency of the object to be evaluated to the learning model. FIG. 19 illustrates an example of the evaluation results of the second embodiment. As shown in the figure, the score regarding whether there is abnormal noise from the object to be evaluated and the contribution rates derived for each order of interest α, β, . . . and each octave center frequency (2000 Hz, 4000 Hz, and 8000 Hz) of the object to be evaluated are output as the evaluation results. The designer can thus determine which parts of the object to be evaluated need modification by checking which of the orders of interest α, β, . . . has a high contribution rate and which octave center frequency of that order has the high contribution rate. Design therefore becomes easy.

In the second embodiment, the comparison calculation is performed by multiplication. However, the comparison calculation may be performed by subtraction. That is, any calculation method can be used as long as the tendency of the relationship between the rotational speed and the sound pressure level on the order line of the order of interest and the tendency of the relationship between the rotational speed and the sound pressure level at the octave center frequency can be compared.

In the first and second embodiments, the disclosure is applied to the abnormal noise evaluation system. However, the disclosure may be in the form of an abnormal noise evaluation method.

The correspondence between the main elements of the embodiments and the main elements of the disclosure described in the section "SUMMARY" will be described. In the embodiments, the analysis device 12 is an example of "analysis device", the feature generation unit 32 of the artificial intelligence module 30 is an example of "feature generation unit", the learning unit 33 of the artificial intelligence module 30 is an example of "learning unit", the evaluation unit 34 of the artificial intelligence module 30 is an example of the "evaluation unit", and the display 21 is an example of "output unit".

As the embodiments are merely examples specifically illustrating the modes for carrying out the disclosure described in the section "SUMMARY", the correspondence between the main elements of the embodiments and the main elements of the disclosure described in "SUMMARY" are not intended to limit the elements of the disclosure described in "SUMMARY". That is, the disclosure described in "SUMMARY" should be construed based on the description in "SUMMARY", and the embodiments are merely specific examples of the disclosure described in "SUMMARY".

Although the modes for carrying out the disclosure are described above based on the embodiments, it should be understood that the disclosure is not limited in any way to these embodiments and the disclosure can be carried out in various forms without departing from the spirit and scope of the disclosure.

The disclosure can be used in the manufacturing industry of abnormal noise evaluation systems.

What is claimed is:

1. An abnormal noise evaluation system that evaluates whether there is abnormal noise from an object to be evaluated including a rotating body mounted on a vehicle, the abnormal noise evaluation system comprising:
   an analysis device configured to acquire running noise of the vehicle and analyze the running noise of the vehicle to generate analysis data;
   a feature generation unit configured to extract a rotational order component of the running noise of the vehicle from the analysis data and generate features for each rotational order of the running noise of the vehicle based on the extracted rotational order component;
   a learning unit configured to generate a learning model as training data, using a combination of the features for each rotational order and an evaluation result, the features for each rotational order being generated by the analysis device and the feature generation unit for a learning object that is of the same type as the object to be evaluated, the evaluation result being given in advance to the learning object;

an evaluation unit configured to evaluate whether there is abnormal noise from the object to be evaluated by applying the features for each rotational order generated by the analysis device and the feature generation unit for the object to be evaluated to the learning model; and an output unit configured to output an evaluation result obtained by the evaluation unit, wherein the analysis device is configured to acquire the running noise of the vehicle at a plurality of rotational speeds of the rotating body and perform a frequency analysis of the running noise of the vehicle for each rotational speed to generate, as the analysis data, sound pressure data representing a sound pressure at each rotational speed and each frequency; and the feature generation unit is configured to extract the rotational order component from the sound pressure data.

2. The abnormal noise evaluation system according to claim 1, wherein the feature generation unit is configured to estimate a background noise component based on the sound pressure data and extract the rotational order component from data resulting from removing the background noise component from the sound pressure data.

3. The abnormal noise evaluation system according to claim 2, wherein the feature generation unit is configured to statistically process the rotational order component for each rotational order to generate statistical values for each rotational order as the features for each rotational order.

4. The abnormal noise evaluation system according to claim 1, wherein the feature generation unit is configured to derive for each rotational order a tendency of a first relationship that is a relationship between the rotational speed and the sound pressure from the sound pressure data, derive a tendency of a second relationship that is a relationship between the rotational speed and the sound pressure at an octave center frequency from the sound pressure data, and compare the tendency of the first relationship and the tendency of the second relationship for each rotational order to produce each comparison result as the features for each rotational order of the running noise of the vehicle.

5. The abnormal noise evaluation system according to claim 4, wherein the feature generation unit is configured to calculate a slope of a first regression line that is applied to the relationship between the rotational speed and the sound pressure for each rotational order as the tendency of the first relationship and calculate a slope of a second regression line that is applied to the relationship between the rotational speed and the sound pressure at the octave center frequency as the tendency of the second relationship.

6. The abnormal noise evaluation system according to claim 5, wherein the feature generation unit is configured to multiply the slope of the first regression line and the slope of the second regression line for each rotational order to generate a multiplied product of the slope of the first regression line and the slope of the second regression line as the features for each rotational order of the running noise of the vehicle.

7. The abnormal noise evaluation system according to claim 1, wherein the output unit is configured to output the evaluation result of the object to be evaluated and a level of contribution of each feature for each rotational order to the evaluation result.

8. An abnormal noise evaluation method for evaluating whether there is abnormal noise from an object to be evaluated including a rotating body mounted on a vehicle, the abnormal noise evaluation method comprising:

acquiring running noise of the vehicle and analyzing the running noise of the vehicle to generate analysis data;

extracting a rotational order component of the running noise of the vehicle from the analysis data and generating features for each rotational order of the running noise of the vehicle based on the extracted rotational order component;

generating a learning model as training data, using a combination of the features for each rotational order and an evaluation result, the features for each rotational order being generated for a learning object that is of the same type as the object to be evaluated, the evaluation result being given in advance to the learning object; and evaluating whether there is abnormal noise from the object to be evaluated by applying the features for each rotational order generated for the object to be evaluated to the learning model, wherein the running noise of the vehicle is acquired at a plurality of rotational speeds of the rotating body and a frequency analysis of the running noise of the vehicle is performed for each rotational speed to generate, as the analysis data, sound pressure data representing a sound pressure at each rotational speed and each frequency; and the rotational order component is extracted from the sound pressure data.

* * * * *